(12) United States Patent
Lloyd et al.

(10) Patent No.: US 11,249,757 B1
(45) Date of Patent: Feb. 15, 2022

(54) HANDLING AND FUSING LOAD INSTRUCTIONS IN A PROCESSOR

(71) Applicant: International Business Machines Corporation, Armonk, NY (US)

(72) Inventors: Bryan Lloyd, Austin, TX (US); Brian W. Thompto, Austin, TX (US); Dung Q. Nguyen, Austin, TX (US); Sheldon Bernard Levenstein, Austin, TX (US); Brian D. Barrick, Pflugerville, FL (US); Christian Gerhard Zoellin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/993,552

(22) Filed: Aug. 14, 2020

(51) Int. Cl.
*G06F 9/30* (2018.01)
*G06F 9/38* (2018.01)
*G06F 9/52* (2006.01)

(52) U.S. Cl.
CPC ........ *G06F 9/30043* (2013.01); *G06F 9/3802* (2013.01); *G06F 9/3853* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 5,613,121 A * | 3/1997 | Blainey | G06F 8/443 717/151 |
| 6,336,168 B1 * | 1/2002 | Frederick, Jr. | G06F 9/30181 711/141 |
| 6,654,869 B1 * | 11/2003 | Kahle | G06F 9/382 712/209 |
| 6,889,318 B1 | 5/2005 | Wichman | |
| 6,920,546 B2 | 7/2005 | Gochman et al. | |

(Continued)

FOREIGN PATENT DOCUMENTS

| | | | | |
|---|---|---|---|---|
| EP | 2806354 A1 | 11/2014 | | |
| GB | 2588206 A | * 4/2021 | ......... | G06F 9/30043 |
| GB | WO-2021074585 A1 | * 4/2021 | ......... | G06F 9/30043 |

OTHER PUBLICATIONS

'Load Immediate' from ccsu.edu, Jan. 19, 2019. (Year: 2019).*

(Continued)

*Primary Examiner* — Steven G Snyder
(74) *Attorney, Agent, or Firm* — Scully, Scott, Murphy & Presser, P.C.

(57) ABSTRACT

A system, processor, and/or technique configured to: determine whether two or more load instructions are fusible for execution in a load store unit as a fused load instruction; in response to determining that two or more load instructions are fusible, transmit information to process the two or more fusible load instructions into a single entry of an issue queue; issue the information to process the two or more fusible load instructions from the single entry in the issue queue as a fused load instruction to the load store unit using a single issue port of the issue queue, wherein the fused load instruction contains the information to process the two or more fusible load instructions; execute the fused load instruction in the load store unit; and write back data obtained by executing the fused load instruction simultaneously to multiple entries in the register file.

18 Claims, 8 Drawing Sheets

(56) References Cited

U.S. PATENT DOCUMENTS

| | | | |
|---|---|---|---|
| 9,244,686 B2 | 1/2016 | Henry et al. | |
| 9,477,476 B2* | 10/2016 | Brown | G06F 9/3017 |
| 10,037,211 B2* | 7/2018 | Fernsler | G06F 12/0875 |
| 10,275,217 B2* | 4/2019 | Gopal | G06F 9/30025 |
| 10,282,296 B2 | 5/2019 | Brandt et al. | |
| 10,372,452 B2* | 8/2019 | Kitchin | G06F 12/0875 |
| 10,540,184 B2* | 1/2020 | Gschwind | G06F 9/30043 |
| 10,545,766 B2* | 1/2020 | Gschwind | G06F 9/461 |
| 10,552,164 B2* | 2/2020 | Gschwind | G06F 9/384 |
| 10,564,977 B2* | 2/2020 | Gschwind | G06F 9/3863 |
| 10,564,978 B2* | 2/2020 | Fernsler | G06F 13/4068 |
| 10,572,265 B2* | 2/2020 | Gschwind | G06F 9/30145 |
| 10,579,389 B2 | 3/2020 | Caulfield et al. | |
| 10,592,251 B2* | 3/2020 | Gschwind | G06F 9/461 |
| 10,732,981 B2* | 8/2020 | Gschwind | G06F 9/30043 |
| 10,740,108 B2* | 8/2020 | Gschwind | G06F 9/3863 |
| 10,782,979 B2* | 9/2020 | Gschwind | G06F 9/384 |
| 10,838,733 B2* | 11/2020 | Gschwind | G06F 9/3861 |
| 10,901,745 B2* | 1/2021 | Lichtenau | G06F 9/30098 |
| 10,956,155 B2* | 3/2021 | Kitchin | G06F 9/3838 |
| 11,061,684 B2* | 7/2021 | Gschwind | G06F 9/384 |
| 11,163,571 B1* | 11/2021 | Barrick | G06F 9/30181 |
| 2012/0278595 A1* | 11/2012 | Indukuru | G06F 9/3855 712/219 |
| 2014/0149722 A1* | 5/2014 | Brown | G06F 9/3017 712/226 |
| 2016/0246600 A1 | 8/2016 | Ouziel et al. | |
| 2017/0090941 A1* | 3/2017 | Eisen | G06F 9/3857 |
| 2017/0249144 A1* | 8/2017 | Jaget | G06F 9/30145 |
| 2017/0277542 A1* | 9/2017 | Fernsler | G06F 9/3851 |
| 2018/0267775 A1* | 9/2018 | Gopal | G06F 7/57 |
| 2018/0267800 A1* | 9/2018 | Kitchin | G06F 9/3838 |
| 2018/0293077 A1* | 10/2018 | Fernsler | G06F 9/3851 |
| 2018/0300142 A1* | 10/2018 | Gschwind | G06F 9/30043 |
| 2018/0300143 A1* | 10/2018 | Gschwind | G06F 9/30054 |
| 2018/0300149 A1* | 10/2018 | Gschwind | G06F 9/461 |
| 2018/0300150 A1* | 10/2018 | Gschwind | G06F 9/30043 |
| 2018/0300154 A1* | 10/2018 | Gschwind | G06F 9/30043 |
| 2018/0300155 A1* | 10/2018 | Gschwind | G06F 9/30058 |
| 2018/0300156 A1* | 10/2018 | Gschwind | G06F 9/3863 |
| 2018/0300157 A1* | 10/2018 | Gschwind | G06F 9/30116 |
| 2018/0300158 A1* | 10/2018 | Gschwind | G06F 9/30021 |
| 2018/0300159 A1* | 10/2018 | Gschwind | G06F 9/3842 |
| 2019/0171452 A1* | 6/2019 | King | G06F 9/3004 |
| 2019/0278603 A1* | 9/2019 | Kitchin | G06F 9/3826 |
| 2019/0324758 A1* | 10/2019 | Gschwind | G06F 9/461 |
| 2020/0004550 A1* | 1/2020 | Thakker | G06F 9/3017 |
| 2020/0042322 A1* | 2/2020 | Wang | G06F 9/30181 |
| 2020/0125367 A1* | 4/2020 | Gschwind | G06F 9/3863 |
| 2021/0349721 A1* | 11/2021 | Eyole | G06F 9/30098 |

OTHER PUBLICATIONS

'Dynamic Instruction Fusion' Thesis by Ian Lee, Dec. 2012. (Year: 2012).*

'Reducing Design Complexity of the Load/Store Queue' by II Park et al., copyright IEEE, 2003. (Year: 2003).*

Ni et al. "Combining Instruction Prefetching with Partial Cache Locking to Improve WCET in Real-Time Systems." PLos ONE:e82975, doi:10.1371/journal.pone.0082975. Dec. 26, 2013. vol. 8 Issue 12. 19 pages.

Lu et at. "Instruction Fusion for Multiscalar and Many-Core Processors." International Journal of Parallel Programming, DOI: 10.1007/s10766-015-0386-1. Accepted May 20, 2015 and published online Sep. 30, 2015. 45(1). 67-78.

* cited by examiner

HANDLING AND FUSING LOAD INSTRUCTIONS IN A PROCESSOR

BACKGROUND OF INVENTION

The present invention generally relates to data processing (information handling) systems, processors, processor pipelines, and methods of handling load instructions in systems and/or processors.

Processors currently used in data processing systems process more than one instruction at a time, and often process those instructions out-of-order. In modern computer architecture, there are several known ways to design a computer adapted to perform more than one instruction at a time, or at least in the same time frame, including for example, using multiple execution slices within a processor core to process multiple instruction threads at the same time, with the threads sharing certain resources of the processor core. An execution slice may refer to multiple data processing hardware units connected in series like a pipeline within a processor to process multiple instructions in a single processing cycle. Pipelining involves processing instructions in stages, so that a number of instructions are processed concurrently.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. The execution units typically include queues and caches to hold data and instructions for the execution units. There are usually register files also associated with the execution units and/or the issue queue to hold data and/or information for the execution units.

SUMMARY

The summary of the disclosure is given to aid understanding of a computer system, computer architectural structure, processor, processor pipelines, register files, execution units including Load Store execution Units (LSUs), and method of handling instructions in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In one or more embodiments, a computer system, processor, and/or method for processing information is disclosed. In an embodiment, the computer system includes at least one processor having circuitry and logic to process instructions, the processor having: an instruction fetch unit having circuitry and logic to process instructions, the instruction fetch unit configured to fetch instructions; an instruction issue unit having circuitry and logic to process instructions, the instruction issue unit having an issue queue having a plurality of entries to hold the instructions and a plurality of issue ports to issue the instructions held in one or more of the plurality of issue queue entries; one or more execution units having circuitry and logic to process instructions, the one or more execution units including a load store unit to process one or more load and store instructions; and a register file to hold data for processing by the processor, the register file having a plurality of entries to hold the data. The system, processor, and/or technique in an aspect is configured to: determine whether two or more load instructions are fusible for execution in the load store unit as a fused load instruction; in response to determining that two or more load instructions are fusible for execution in the load store unit as a fused load instruction, transmit information to process the two or more fusible load instructions into a single entry of the plurality of entries in the issue queue; issue the information to process the two or more fusible load instructions from the single entry in the issue queue as a fused load instruction to the load store unit using a single issue port of the plurality of issue ports in the issue queue, wherein the fused load instruction contains the information to process the two or more fusible load instructions; execute the fused load instruction in the load store unit; and write back data obtained by executing the fused load instruction simultaneously to multiple entries in the register file. In an aspect, the system, processor, and/or technique is further configured to determine whether two or more load instructions are fusible by detecting if the load instructions are consecutive load instructions, have real address fields that are the same, and immediate fields that are consecutive to each other in a data cache. The system, processor, and/or technique according to an embodiment is further configured to determine whether two or more load instruction sequences are ascending fusible load instructions or descending fusible load instructions.

The system, processor, and/or technique in one or more aspects is further configured to: in response to determining that two or more load instructions are fusible, mark the two or more fusible load instructions as fusible; and thereafter, transmit the information to process the two or more fusible instructions into the single entry in the issue queue. In an embodiment, the system, processor, and/or technique in an embodiment is further configured to transmit the information to process the two or more fusible load instructions over multiple data lanes to the issue queue where the information to process each fusible load instruction is transmitted over a single data lane to the issue queue. In response to executing the fused load instruction in the load store unit, the load store unit in an embodiment is configured to read out multiple consecutive data chunks from a data cache in the load store unit. The system, processor, and/or technique in one or more aspects is further configured to: transmit the two or more fusible load instructions to a dispatch unit; assign by the dispatch unit an instruction identifier to each fusible load instruction; and dispatch the information to process the two or more fusible load instructions to the single entry in the issue queue over multiple lanes where a single lane is used for each fusible load instruction dispatched to the single entry in the issue queue. In a further aspect, the system, processor, and/or technique is further configured to: dispatch multiple instruction identifiers to an instruction completion unit having a completion table for tracking the completion of instructions, where each instruction identifier corresponds to one of the two or more fusible load instructions; write each dispatched instruction identifier to one of a plurality of entries in the completion table; and mark the entries in the completion table corresponding to the two or more fusible load instructions to complete together.

The system, processor, and/or technique in an aspect is further configured to write a first portion of the fused load instruction to a first entry in the register file using a register file write port associated with the load store unit and write a second portion of the fused load instruction to a second entry in the register file using a register file write port associated with an execution unit other than the load store unit. In an embodiment, the system, processor, and/or technique is configured to: process two-consecutive load-immediate instructions as a fusible load instruction, in response to detecting two consecutive load-immediate instructions as a fusible load instruction, transmit the two fusible load instructions into a single entry of the plurality of entries in the issue queue; issue the two fusible load instructions from the single entry in the issue queue as a fused load instruction to the load store unit, wherein the fused load instruction contains the two fusible load instructions; execute the fused load instruction in the load store unit; and write back data obtained by executing the fused load instruction simultaneously to two entries in the register file.

A system, processor, and/or technique for processing information according to an embodiment, has a processor that includes: (a) an instruction fetch unit having circuitry and logic to process instructions, the instruction fetch unit configured to fetch instructions; (b) a dispatch unit having circuitry and logic to receive instructions from the instruction fetch unit and to dispatch the instructions; (c) an issue queue having circuitry and logic to process instructions, the issue queue having a plurality of entries to hold the instructions dispatched by the dispatch unit and a plurality of issue ports to issue the instructions held in one or more of the plurality of issue queue entries; (d) an instruction completion table (ICT) having circuitry and logic to track the instructions dispatched by the dispatch unit, the ICT having a plurality of entries to store data; (e) one or more execution units having circuitry and logic to process instructions, the one or more execution units including a load store unit to process one or more load and store instructions; (f) a main register file having circuitry and a plurality of entries for storing data, one or more write ports to write data to the main register file entries, and one or more read ports to read data from the main register file entries; and (g) a mapper having circuitry and logic to map one or more main register file entries to one or more logical addresses used by the processor. The system, processor, and/or technique in an embodiment is configured to: determine whether two load instructions are fusible for execution in the load store unit as a fused load instruction; in response to determining that two load instructions are fusible for execution in the load store unit as a fused load instruction, transmit information to process the two fusible load instructions into a single entry of the plurality of entries in the issue queue; issue the information to process the two fusible load instructions from the single entry in the issue queue as a fused load instruction to the load store unit, wherein the fused load instruction contains the information to process the two fusible load instructions; execute the fused load instruction in the load store unit; and write back data obtained by executing the fused load instruction simultaneously to two entries in the register file.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of the computer system, computer architectural structure, processors, processor pipelines, register files and/or their method of operation will be better understood when read in conjunction with the figures provided. Embodiments are provided in the figures for the purpose of illustrating aspects, features, and/or various embodiments of the computer system, computer architectural structure, processors, processor pipelines, register files, and their method of operation, but the claims should not be limited to the precise system, embodiments, methods, processes and/or devices shown, and the features, and/or processes shown may be used singularly or in combination with other features, and/or processes.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, accumulator register files, and their method of operation, however, it will be understood by those skilled in the art that different and numerous embodiments of the computer system, computer architectural structure, processor, register files, accumulator register files, and their method of operation can be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and, in particular, with processors which operate in an out-of-order execution fashion, including multi-slice processors and their use of registers. It may be noted that a numbered element is numbered according to the figure in which the element is introduced, and is often, but not always, referred to by that number in succeeding figures.

Figure 1:
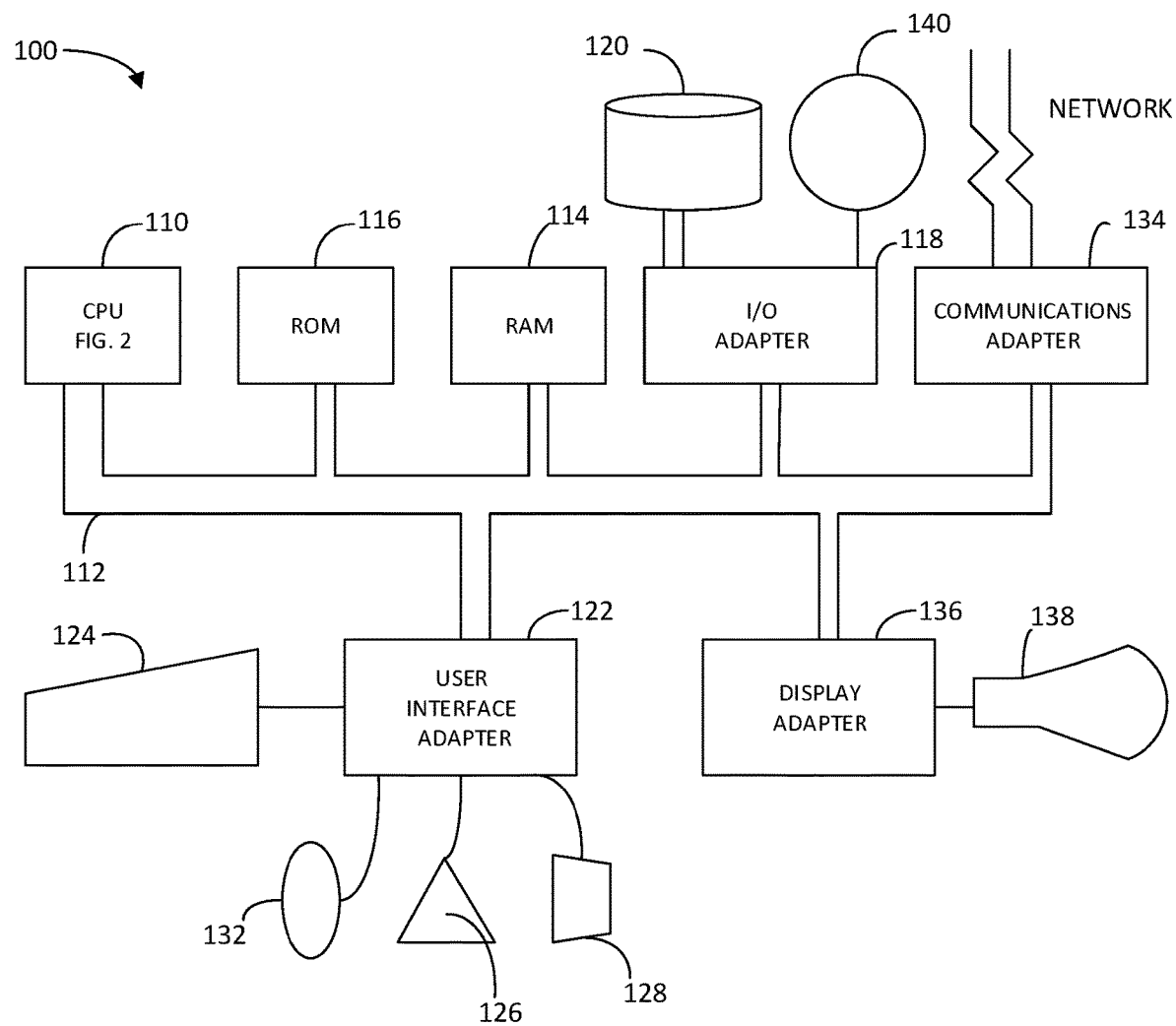
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) or processor 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

Figure 2:
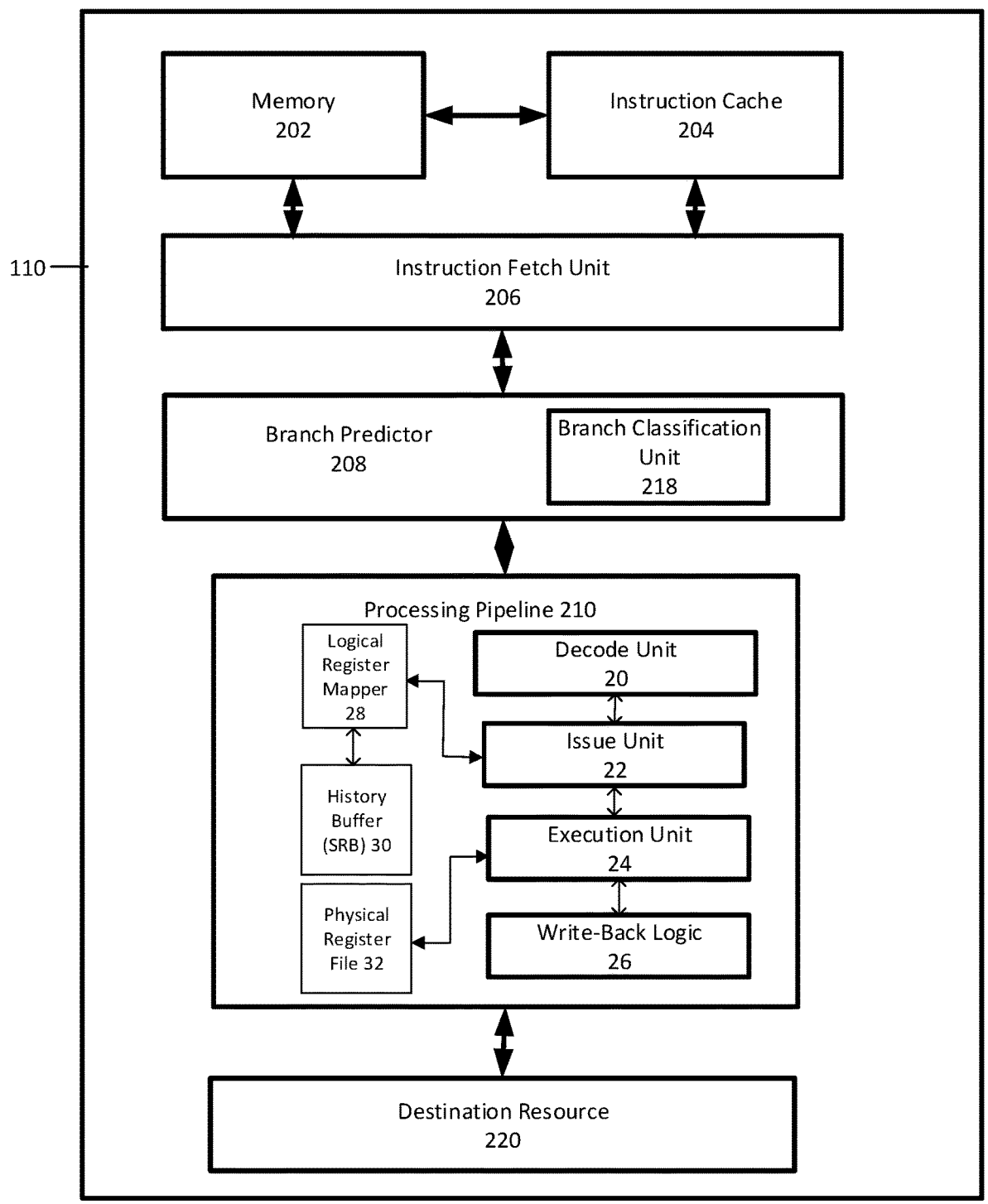
FIG. 2 illustrates a block diagram of an embodiment of a processor in which certain aspects of the present disclosure may be practiced.

FIG. 2 depicts a simplified block diagram of a processor 110 according to an embodiment. The CPU (or "processor") 110 includes units formed by integrated circuitry, and may operate according to reduced instruction set computing ("RISC") techniques. The CPU 110 processes according to processor cycles, synchronized, in some aspects, to an internal clock (not shown). In the example of FIG. 2, the processor 110 includes memory 202, instruction cache 204, instruction fetch unit (IFU) 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory. The memory 202 and instruction cache 204 can include multiple cache levels.

In FIG. 2, a simplified example of the instruction fetch unit (IFU) 206 and the processing pipeline 210 are depicted. In various embodiments, the processor 110 may include multiple processing pipelines 210 and instruction fetch units (IFUs) 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit (IFU) 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit (IFU) 206 fetches instructions from the instruction cache 204 for further processing by the decode unit 20. The decode unit 20 decodes instructions and passes the decoded instructions or portions of instructions to the issue unit 22. The decode unit 20 may also detect branch instructions which were not predicted by branch predictor 208. The issue unit 22 analyzes the instructions or other data and transmits the decoded instructions or portions of instructions to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units (LSUs), vector scalar execution units (VSUs), and/or other execution units. The logical register mapper 28 contains entries which provide a mapping between a logical register entry (LReg) and an entry in the physical register file 32. When an instruction specifies to read or to store information to a logical register entry (LReg), the logical register mapper 28 informs the issue unit 22, which informs the execution unit 24 where the data in the physical register file 32 can be located or stored.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer stores information from the logical register mapper 28 when a new instruction evicts data from the logical register mapper 28 in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
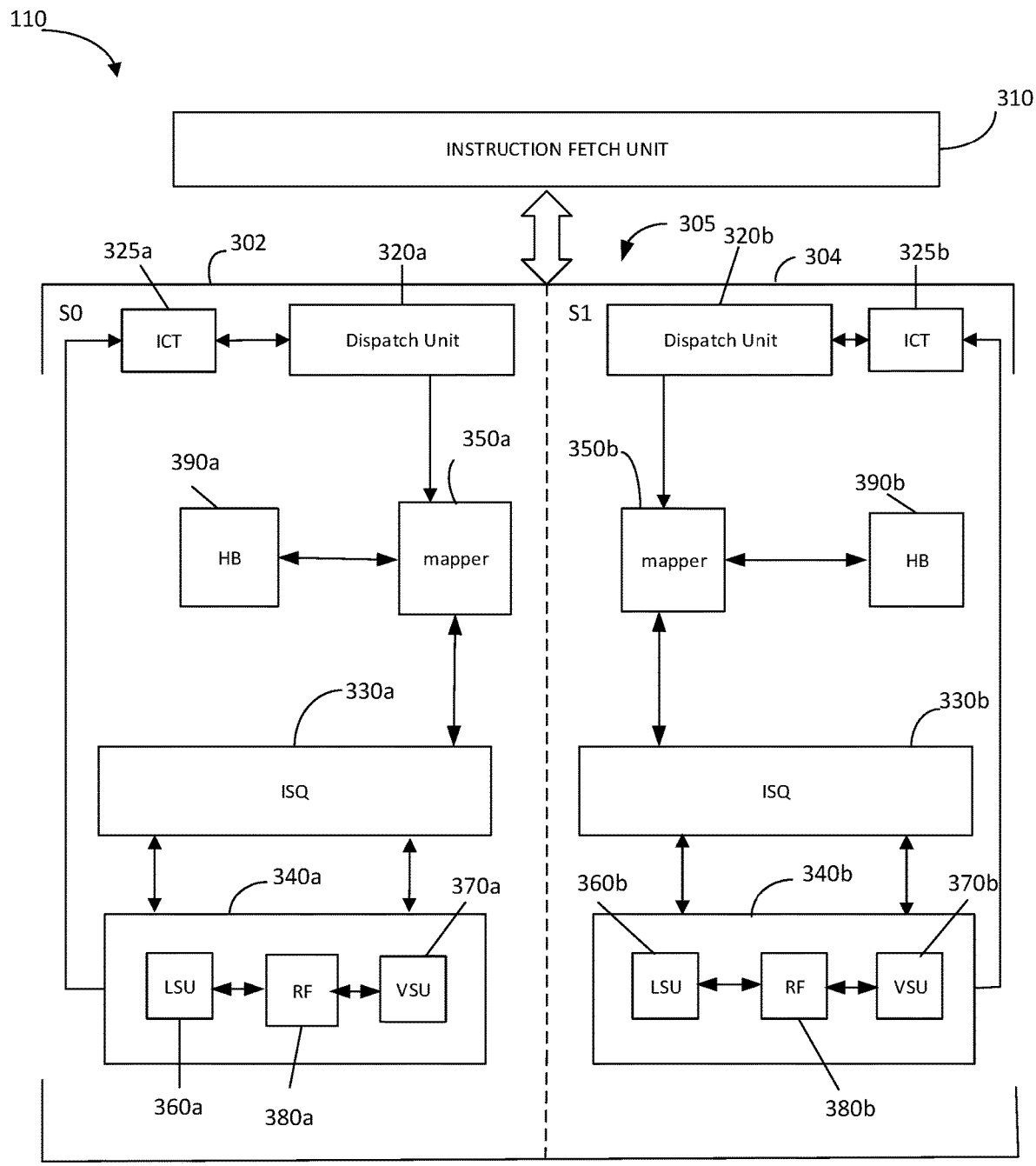
FIG. 3 illustrates a block diagram of an embodiment of a portion of a multi-slice processor.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other components, functional units, and/or configurations. As shown in FIG. 3, the multi-slice processor includes two processing slices-Slice 0 (slice S0 or 302) and Slice 1 (slice S1 or 304). The processor includes an Instruction Fetch unit 310. Each of the slices S0 and S1 includes an Instruction Dispatch Unit (320a and 320b); a Logical Register Mapper (350a and 350b); a History Buffer (HB) (370a and 370b); an Issue Queue (ISQ) (330a and 330b); an Instruction Completion Table (ICT) (325a and 325b); and one or more Execution Units (340a and 340b). The one or more execution units (EXUs) could include, for example, a load store unit (LSU) (360a and 360b), a vector scalar unit (VSU) (370a and 370b), and a Register File (RF) (380a and 380b). The Execution Unit (EXU) 340 may include one or more queues to hold instructions for execution by the Execution Unit 340. For example, the LSU 360 can include a load queue and/or a store queue, and can also include a data cache, for example, a L1 data cache.

It may be noted that the two slices are shown for ease of illustration and discussion only, and that multi-slice processor 110 may include more than two processing or execution slices with each slice having more or less than the components discussed above for each of the slices S0 and S1 (slices 302 and 304). Further, the processing slices may be grouped into super slices (SS 305), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit (IFU) 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

In certain aspects, the ISQ 330 holds a set of instructions and the register file (RF) 380 accumulates data for the instruction inputs. A register file may be used for staging data between memory and other functional (execution) units in the processor. There may be numerous register files and types. When all source data accumulates for the instruction, the data is passed on to one or more execution units designated to execute the instruction. Each of the execution units, e.g., LSUs 360 and VSUs 370, may make result data available on the write back buses for writing to a register file (RF) entry. The register file (RF) 380 may in one or more embodiments be a STF register file, which in an aspect may be partitioned or segmented, and can include general purpose register files (GPR) and/or vector scalar register files (VSR).

When data is not ready, e.g., not within the appropriate data cache or register, delay can result as the ISQ 330 will not issue the instruction to the Execution Unit portion 340 of the processor pipeline (302, 304). For at least this reason, the Issue Queue (ISQ) typically issues instructions to the Execution Units 340 out-of-order so instructions where the required data is available can be executed. Dispatch Unit 320 in one or more embodiments will stamp each instruction dispatched to the Issue Queue 330 with an identifier, e.g., identification tag (iTag), to identify the instruction. The Dispatch Unit 320 may stamp instructions with other information and metadata. The instructions (iTags) typically are allocated (assigned) and stamped in ascending program order on a per thread basis by the Dispatch Unit 320.

Logical register mapper 350 contains metadata (e.g., iTag, RFtag, etc.) which provides a mapping between entries in the logical register (e.g., GPR1) and entries in physical register file (RF) 380 (e.g., physical register array entry). The RFtag is the pointer that correlates a logical register entry to a physical register file entry in the register file (RF) 380. For example, when an instruction wants to read a logical register, e.g., GPR1, the logical register mapper 350 tells Issue Queue (ISQ) 330, which tells the execution unit 340 where in the physical register file 380 it can find the data, e.g., the physical register array entry. The Execution Unit 340 executes instructions out-of-order and when the Execution Unit 340 finishes an instruction, the Execution Unit 340 will send the finished instruction, e.g., iTag, to the ICT 325. The ICT 325 contains a queue of the instructions (iTags) dispatched by the Dispatch Unit 320 and tracks the progress of the instructions (iTags) as they are processed.

History Buffer (HB) 390, also referred to as a Store Reorder Buffer (SRB) 390, contains logical register entries that are evicted from the logical register mapper 350 by younger instructions. The information stored in the History Buffer (HB) or SRB 390 may include the iTag of the instruction that evicted the logical register entry (i.e., the evictor iTag) from the logical register. History Buffer (HB) 390, in an embodiment, stores iTag, logical register entry number (the bit field that identifies the logical register entry (LReg)), and Register File tag (RFTag) information. History Buffer (HB) 390 may store and track other information. History Buffer (HB) 390 has an interface to the logical register mapper 350 to recover the iTag, and register file tag (RFTag) (and other meta data) for each evicted logical register entry (LReg). The information is kept in the History Buffer (HB) 390 in a history buffer (HB) entry until the new instruction (evictor instruction) is completed. At which point, in an embodiment, the entry is removed from the History Buffer (HB) 390.

A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple execution slices may considerably increase processing speed of the multi-slice processor. In single-thread (ST) mode a single thread is processed, and in SMT mode, two or more threads (SMT2), (SMT4) are simultaneously processed.

To improve processor efficiency and performance, in one or more embodiments, two consecutive load instructions with adjacent addresses can be executed simultaneously, for example the load instructions in an aspect can be fused together and executed simultaneously. In an embodiment the LSU can write the result of the fused load instruction to two register files simultaneously. In one or more embodiments, the LSU processing such fused load instructions will write back two chunks, portions, or halves of data, including for example two 128-bits of data, to two entries in the register file. In one or more embodiments, the data of the first portion, chunk, or half of the fused load is written to the register file using a write port associated with the LSU and the data of the second chunk, portion, or half of a fused load is written to the register file using a write port associated with another, different execution unit.

Figure 4:
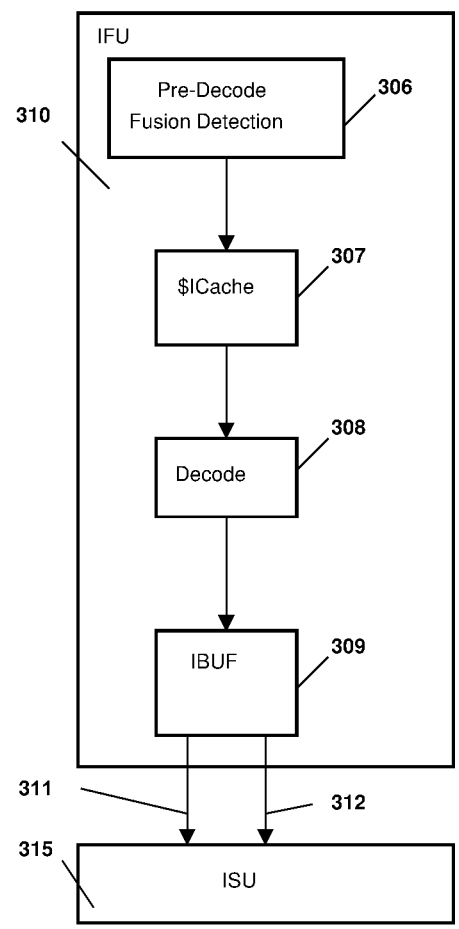
FIG. 4 illustrates a block diagram of an embodiment of an instruction fetch unit in a processor.

The processor 110 and processor pipeline shown in FIGS. 4-7 includes an Instruction Fetch Unit (IFU) 310, an Instruction Issue Unit (ISU) 315, and Execution Unit (EXU) portion 340. FIG. 4 shows a simplified block diagram of an Instruction Fetch Unit (IFU) 310 in a processor 110 according to an embodiment in which one or more of the invention(s) can be processed. The Instruction Fetch Unit (IFU) 310 includes an instruction pre-decode 306 for detecting two consecutive load-intermediate instructions that are fusible, e.g., capable of being executed as a single fused instruction in the LSU 370 and written into two entries in the register file (RF) 380, e.g., STF register file 380. In one or more embodiments, fusible load-immediate instructions are the same length and the addresses are next to each other. The IFU 310 will detect if the Real Address (RA) field of the two load instructions are the same and if the immediate fields are consecutive to each other in the data cache, e.g., the L1 data cache in the LSU 370. In an example a load immediate instruction has the format of: LD RT, RA, Imm, where EA=RA+Imm. RT is the GPR index to write the load result, RA is the GPR, and Imm (Immediate) is sixteen (16) bit offset in the instruction. An example load-immediate instruction sequence would be:

LW RT=GPR5, RA=GPR6, Immediate (Imm)=0x0004
LW RT=GPR7, RA=GPR6, Immediate (Imm)=0x0008,
where the fused load would be:
LD RT=GPR5, GPR7; RA=GPR6, Immediate (Imm)=0x0004.

If the instructions are fusible, then the pair of load instructions (load0+load1) are both marked as fusible and are written into the Instruction Cache 307. In one or more embodiments, a bit field can be included to mark the instructions as fusible. The pair of load instructions marked as fusible are read from the Instruction Cache 307, decoded further in Decode 308, and placed in Instruction Buffer 309. After the two load instructions (load0+load1) marked as fusible are read from the Instruction Cache 307, the IFU 310 will transmit the two load instructions (load0+load1) to the Instruction Issue Unit (ISU) 315. The two load instructions (load0+load1) marked as fusible and transmitted to the Instruction Issue Unit (ISU) 315 preferably are issued on a lane pair. For example, first fusible load instruction (load0) is issued on lane 311 and second fusible load instruction (load1) is issued on lane 312 to the Instruction Issue Unit (ISU) 315.

Figure 5:
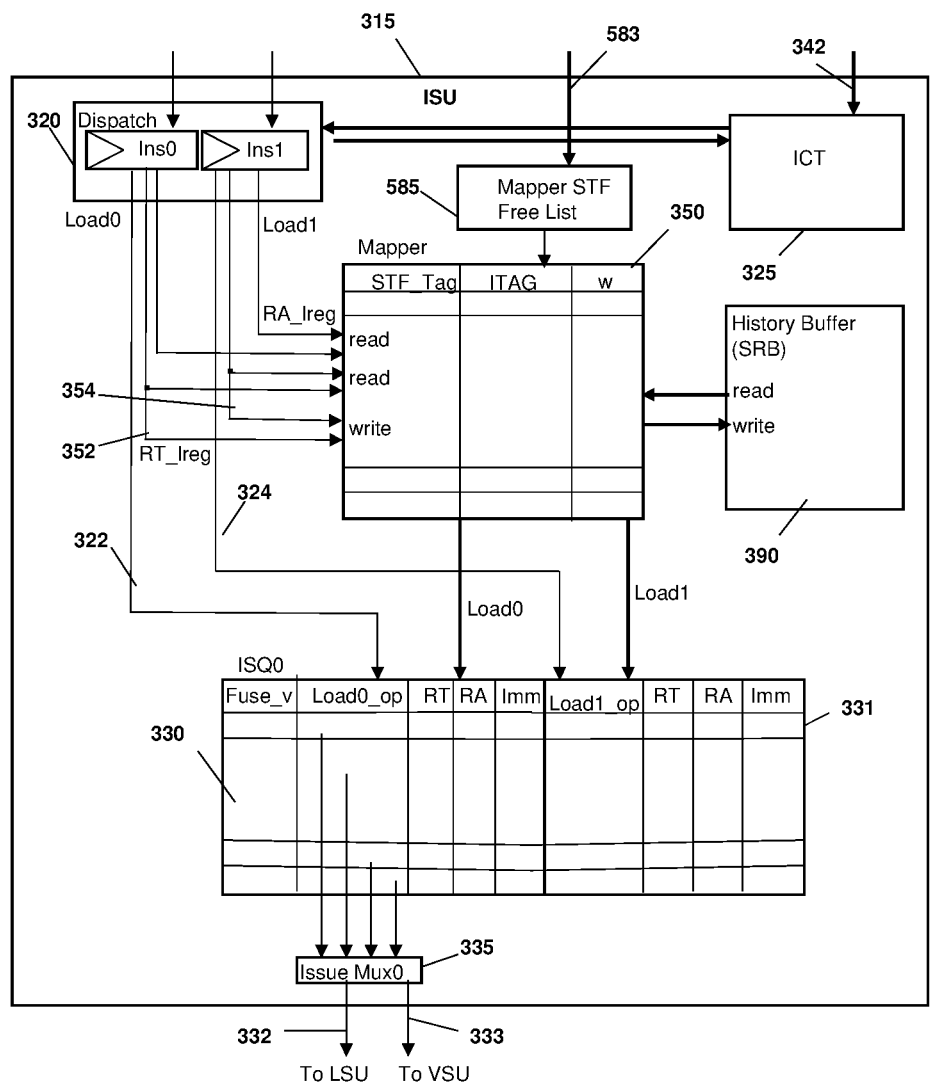
FIG. 5 illustrates a block diagram of an embodiment of an instruction issue unit in a processor.

FIG. 5 shows a simplified block diagram of an Instruction Issue Unit (ISU) 315 in a processor 110 according to an embodiment in which one or more of the inventions can be processed. Instruction Issue Unit (ISU) 315 includes Dispatch Unit 320, an Instruction Complete Table (ICT) 325, an Issue Queue (ISQ) 330 having a plurality of entries 331(*a*)-331(*n*), a logical Mapper 350 having a plurality of entries 351(*a*)-351(*n*), a Mapper STF Freelist 585, and a History Buffer 390 (also referred to as a Store Reorder Buffer (SRB)). Dispatch Unit 320 receives the two load instructions (load0+load1) marked as fusible over lanes 311, 312 from the IFU 310. The Dispatch Unit 320 dispatches the two instructions (load0+load1) marked as fusible to the Issue Queue (ISQ) 330, to the Instruction Completion Table 325, and to the Mapper 350, preferably on a pair of lanes, e.g., two lanes. The Dispatch Unit 320 marks each instruction with an iTag (to identify the instructions), one iTag for each fusible instruction (load0+load1). The ICT 325 writes the two instructions (2 iTags) into two entries in the ICT 325 and marks them as atomic (e.g., they both must be completed together). In one or more embodiments, the ICT 325 will auto-finish the second half of the fused load instruction (load1).

The Mapper (STF) Free-list 585 allocates two STF_Tags to the load instructions (load0/iTag0 and load1/iTag1) marked fusible, one STF_Tag per load instruction marked fusible. The two load instructions (load0/Itag0/STF_Tag0 and load1/Itag1/STF_Tag1) are written into two entries 351 in the logical Mapper 350 over two lanes 352, 354. The two load instructions (load0/iTag0 and load1/iTag1) marked as fusible are written over two lanes 322, 324 into a full ISQ entry 331. That is the two load instructions (load0/iTag0 and load1/iTAg1) are both written into one entry 331 in the ISQ 330. For example, the first load instruction designated load0/Itag0 is sent over lane 322 to ISQ entry 331(*a*) while the second load instruction designated load1/Itag1 is sent over lane 324 to ISQ entry 331(*a*). In an aspect, the fuse valid bit/field is marked valid in the ISQ 330 for the ISQ entry 331(*a*) receiving the fused load (load0/iTag0+load1/iTag1).

The fused load (load0/iTag0+load1/iTag1) will wait in the ISQ 330 until the Real Address (RA) operand of the first portion (e.g., first half) of the fused load instruction is ready. That is the fused load waits in the ISQ 330 until the data for the first portion (first half), e.g., load0/Itag0, of the fused load instruction (load0/iTag0+load1/iTag1) is ready, for example is in the register (STF) file 380 or data cache 365 (shown in FIGS. 6 and 7). When the RA operand is ready, then the fused load instruction (load0/iTag0+load1/iTag1) is issued to the LSU 360 over a single lane 332 using a single LSU issue port. The single fused load instruction (load0/iTag0+load1/iTag1) issued to the LSU 360 in an embodiment identifies two destinations (entries) for the writeback to the STF register file 380, one destination for each portion (half) of the fused load instruction. In one or more embodiments, the ISQ 330 broadcasts both iTags (iTag0+iTag1) of the fused instruction to the Mapper 350 and the ISQ 330 to wake-up their dependencies. The fused load instruction issues from the ISQ 330 along with other instructions to an Issue Multiplexor (mux) 335, and upon selection by the Issue Multiplexor (Mux) 335 the fused load instruction issues to the LSU 360 over a single lane 332. In one or more embodiments, when the load instruction issues to the LSU 360 the LD Issue Valid bit(s), the Opcode (size and whether the instruction is fused) and the writeback (WB) STF tags are sent over lane 332, while the RA STF tag+Imm is sent to the VSU 370, more specifically the Register STF File 380, over lane 333.

Figure 6:
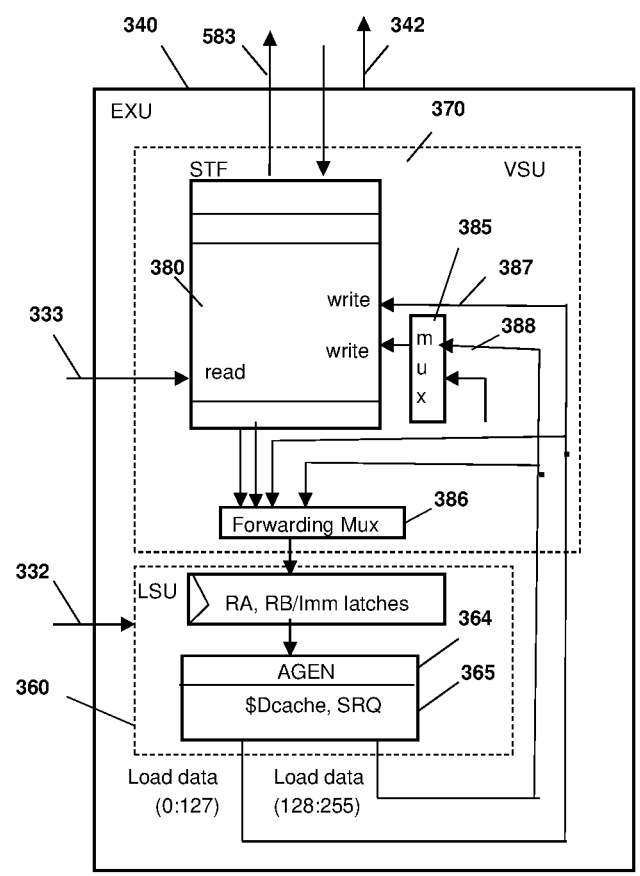
FIG. 6 illustrates a block diagram of an embodiment of an execution portion of a processor.
Figure 7:
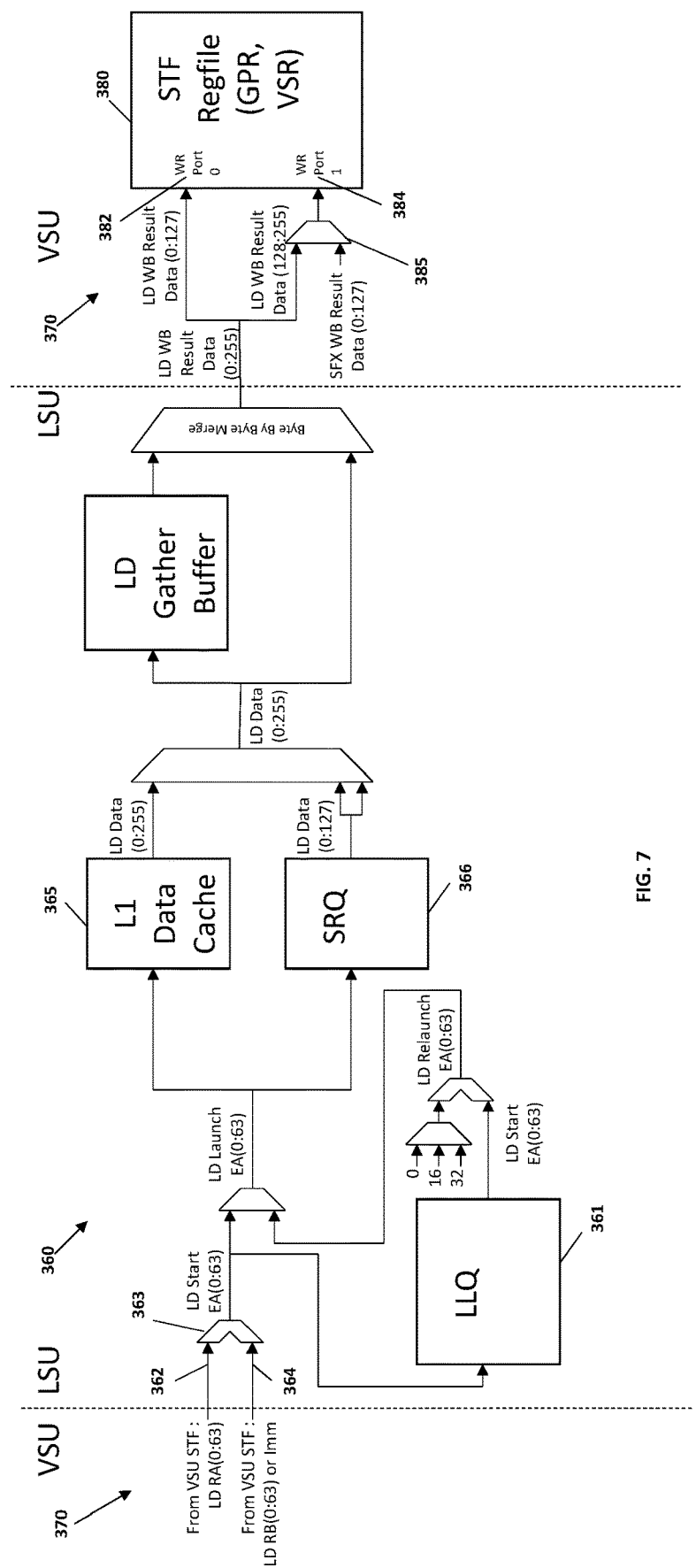
FIG. 7 illustrates a block diagram of an embodiment of a load store unit (LSU) pipeline in a processor.

FIG. 6 shows a simplified block diagram of the execution unit portion (EXU) 340 in a processor 110 according to an embodiment in which one or more of the inventions can be processed. The execution unit portion 340 in one or more embodiments has a Load Store execution Unit (LSU) 360 and a Vector Scalar Execution Unit (VSU) 370. The VSU 370 includes a STF Register File 380 having a plurality of entries 381(a)-381(n). FIG. 7 shows a simplified block diagram of an LSU pipeline 360 in a processor 110 according to an embodiment showing the processing of the fused load instruction including obtaining operand data from the STF Register File 380 and write-back of load data from the fused load instruction to two entries 381 in the STF Register File 380. The fused load instruction issues to the LSU 360 over lane 332. The LSU 360 will decode the opcode to know the load type and load length (e.g., how many bytes to read from the Data Cache 365). Decode of the instruction is one of many pieces of the control logic in the LSU 360 that governs the general load execution behavior. The Load Launch Queue (LLQ) 361 that tracks the load execution state within the out-of-order window for all loads will launch the load operation through the LSU execution pipe. The LSU 360 reads the operand sources from the RA and immediate (Imm) fields of the fused load instruction. As shown in FIG. 7, the LSU 360 the LD RA read from the VSU STF 380 is delivered to first input 362 of Arithmetic Logic Unit (ALU) 363 and the Ld Imm from the VSU STF 380 is delivered to second input 364 of the ALU 363.

In one or more embodiments the LSU 360 will generate one address (AGEN 364 in FIG. 6) to access the Data Cache 365. AGEN 364 can be thought of as adder 363 in FIG. 7 that adds RA+Imm for a fused load to get the EA address used by the data cache 365. The LSU 360 in an embodiment will then read out one or more of the two data chunks, preferably two consecutive data chunks, from the Data Cache 365. The LSU 360 can also read one or more of the data chunks from the Store Queue (SRQ) 366. In an example, the maximum width of the data that the LSU 360 can read is two 128-bit (32 bytes) data chunks from either the Data Cache 365 or the Store Queue (SRQ) 366, although it can be appreciated that other designs having different data width are contemplated. It should be noted that in an embodiment, if either part or portion of the fused load instruction misses in the Data Cache 365, then both parts of the fused load instruction are considered to have missed in the Data Cache 365, and the LSU 360 will wait for the data of all portions (both halves) of the fused load instruction to be available in the Data Cache 365 (or Store Queue 366), and will finish the fused load instruction before indicating to the ICT 325 that the singular fused load instruction sent to the LSU 360 is finished, while simultaneously sending the load result write-back for the fused load instruction to the register (STF) file 380. In one or more embodiments, should the fused load instruction be un-aligned with a cacheline, the LSU 360 will treat all portions (both halves) of the fused load instruction as un-aligned, and the LSU 360 will wait for the data from all portions (both halves) of the fused load to be available before finishing the fused load instruction and indicating to the ICT 325 that the singular fused load instruction sent to the LSU 360 is finished, while simultaneously performing the writeback results to the entries in the register (STF) file 380 associated with the fused load instruction.

The LSU 360 returns all chunks of data (e.g., two data chunks) for write-back to the STF Register 380 and/or forwarding through Forwarding Multiplexor (Mux) 386. As shown in FIGS. 6-7, the first portion or chunk of data returned by the fused load instruction uses the normal LSU data path 387, while the second portion or chunk of data returned by the fused load instruction uses another execution unit's result data path 388, for example the result data path of Fixed Point execution Unit (FXU). The data results of the fused load instruction, e.g., of both load instructions, in one or more embodiments are written to the STF Register File 380 at the same time, and in an aspect are written to two STF Register file entries 381 (381(a) and 381(b)) at the same time. The first data chunk will be sent to the write port 382 of the STF Register file 380 and written to a first STF register file entry (381(a)), while the second chunk of data will be sent to Multiplexor (mux) 385 and selected for write-back to a second STF entry (381(b)) using the write port 384 of the STF Register file 380 associated with another execution unit, e.g., the FXU. The results of the load instruction in the LSU 360 can also be bypassed to the dependent instructions at the operand forwarding mux 386 shown in FIG. 6. The LSU 360 will then finish the fused load instruction as normal. When the fused load instruction is complete the iTag for the completed instruction is sent over lane 342 from the execution unit portion 340 to the ICT 325. When a STF Register File entry 381 is deallocated a signal 583 is sent to the Mapper STF Free List 585.

In an embodiment, ICT 325 will complete all portions/parts (both halves) of the fused load instructions at the same time. If an exception is caused by the fused instruction, then the ICT logic will flush all portions (both halves) of the fused load instruction and signal the IFU 310 to refetch the fused instruction as a cracked load (LSU) instruction, e.g., as two separate load instructions (split the fused instruction). The cracked load (LSU) instruction in an aspect will resume execution from the first portion (first half) of the original fused instruction. That is, the first portion (first half) of the fused instruction, now a separate instruction, will be executed. The exception will be taken on the appropriate portion (half) of the original fused instruction.

In one or more embodiments, the fuse detection at 306 would detect and/or determine both ascending and descending sequences in program order. For example, in an ascending sequence using two 16 byte loads (lxv pneumonic) that fuse into a 32 byte load in the LSU:

lxv RT=VSR32, RA=GPR5, Imm=8
lxv RT=VSR35, RA=GPR5, Imm=24, would fuse to:
lxv RT=VSR32, VSR35, RA=GPR5, Imm=8, where the fused load would access 32 bytes in memory starting at EA=GPR5+8. The first portion or half (16 bytes) of the data are stored in VSR32 and the second portion or half (16 bytes) are stored in VSR35. In an example descending sequence using two 16 byte loads (lxv pneumonic) that fuse into a 32 byte load in the LSU:

lxv RT=VSR35, RA=GPR5, Imm=24
lxv RT=VSR32, RA=GPR5, Imm=8, would fuse to:
lxv RT=VSR32, VSR35, GPR=5, Imm=8, where the fused load would access 32 bytes in memory starting at EA=GPR5+8. The first portion or half (16 bytes) of data are stored in VSR32 and the second portion or half (16 bytes) of data are stored in VSR35. The fused load that is sent to the LSU is identical, and the result of the fused load execution is the same in the ascending sequence as in the descending sequence with the only difference being that the original two load instructions are in reverse order.

Figure 8:
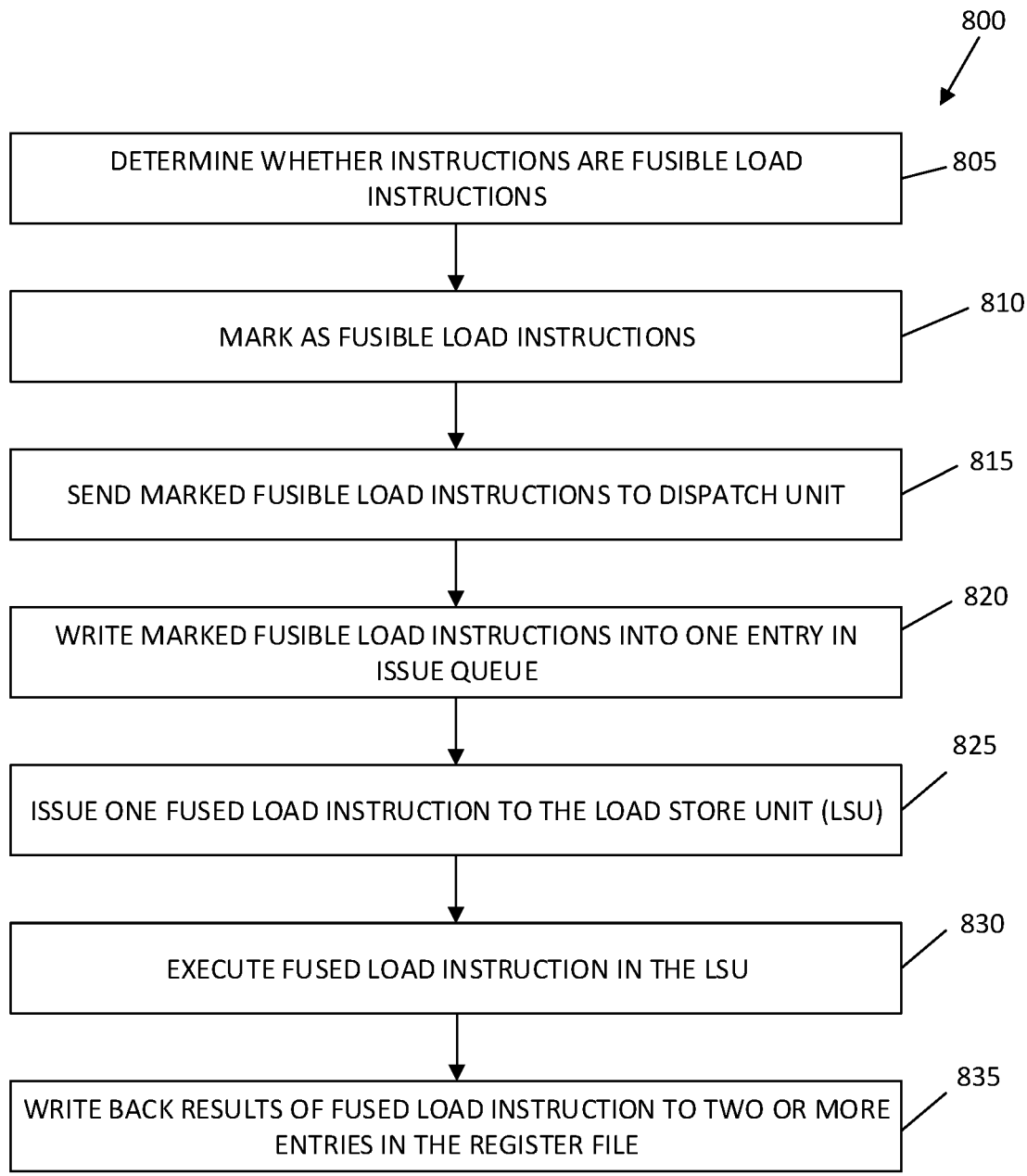
FIG. 8 illustrates flow diagram of a method according to an embodiment for processing a load instruction in a processor.

FIG. 8 is an exemplary flowchart in accordance with one embodiment illustrating and describing a method of handling data, e.g., executing instructions, in a processor, including in an embodiment, processing and handling load instructions, including fusible load-immediate load instruction, in a processor in accordance with an embodiment of the present disclosure. More specifically, the method in an aspect is directed to fusing two load consecutive load-immediate instructions to issue as one instruction from the Issue Queue to the Load Store Unit (LSU), and in an embodiment writing back the results of the fused load instruction to two entries in the STF Register File. While the method 800 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 8, but the process may be integrated and/or one or more steps may be performed together, simultaneously, or the steps may be performed in the order disclosed or in an alternate order.

The method 800 in FIG. 8 relates to processing data in a processor, more specifically to a method and system, to fuse two or more load instructions executable by a processor. In one or more embodiments, at 805 the processor, for example an instruction fetch unit, determines whether instructions are fusible load instructions. The criteria for load instructions to be fusible can vary. In one or more embodiments, the processor determines whether the instructions are load instructions, and in an aspect whether the load instructions are consecutive. In an embodiment, the processor at 805 determines whether the two consecutive load instructions have adjacent addresses, e.g., the addresses of the instructions are next to each other. In one or more aspects, the two consecutive load addresses are fusible if they are load-immediate instructions. According to an embodiment, the processor, for example the instruction fetch unit, will determine or check if the real address (RA) field of the load instructions are the same and if the immediate fields are consecutive to each other in the data cache, e.g., the L1 data cache, in order for the instructions to be fusible. In an aspect, the width of the data handled by the load instructions has to be the same to be fusible. For example, both load instructions should be load-byte, load half, etc.

If the two or more load instructions are fusible, then at 810 the two or more loads are marked as fusible. If the loads are not fusible, then each load instruction is handled normally, e.g., separately. In an aspect, the load instructions marked as fusible at 815 are sent or transmitted to an instruction issue unit (ISU), for example a dispatch unit in the instruction issue unit (ISU). In one or more embodiments, the load instructions marked as fusible are sent to the instruction issue unit (ISU) over multiple lanes. In an embodiment, the load instructions marked as fusible are sent to the dispatch unit over multiple lanes, and in an aspect two load instructions marked as fusible are sent over two lanes to the dispatch unit. The two fusible load instructions in an aspect take two dispatch slots in the dispatch unit.

In one or more embodiments, at 820 the load instructions marked as fusible are written into an issue queue where the load instructions are held until they are sent to an execution unit. According to an embodiment, the dispatch unit dispatches and associates a different iTag (instruction identifier) to each fusible load instruction, and in an aspect dispatches the fusible load instructions to the issue queue. The fusible load instructions in an embodiment are dispatched to the issue queue over multiple lanes, including in an embodiment dispatching two fusible load instructions over two lanes. In an aspect, the fusible load instructions, e.g., the load instructions marked as fusible, are written into one entry in the issue queue as a fused load instruction. In an example, two load instructions that are fusible and marked as fusible having two separate iTags are dispatched to an issue queue over two lanes and are written into a single entry in an issue queue. In an embodiment, the fusible load instructions are written into a full issue queue entry as a fused instruction.

In one or more aspects, as part of the process of 820, an instruction completion unit or table is notified of the fusible instructions sent to the issue queue. For example the iTags associated with the multiple fusible load instructions are sent to the instruction completion table, and in an aspect, the completion table writes the iTags into the completion table. In an embodiment, the completion table will auto finish the associated fusible load instructions when one of the fusible instructions completes. For example, where two load instructions are fusible, the dispatch unit sends two iTags to the instruction completion unit and when the first instruction completes the second instruction auto finishes, e.g., is automatically marked finished. In the case where a system and/or processor uses virtual addresses and/or has a logical mapper, in an embodiment, the fusible load instructions are sent to a logical mapper, and in an aspect a mapper free list allocates tags (e.g., STF tags) for each of the fusible load instructions associating a logical register address to the physical (RA) address.

While the process 800 refers to sending the fusible load instructions to a dispatch unit at 815 and writing the fusible load instructions into an entry in an issue queue at 820 it can be appreciated that 815 and 820 can be performed together and that the load instructions do not have to be sent to a "dispatch unit". The fusible load instructions can be issued and written directly into an issue queue and the activities identified above regarding the "dispatch unit" can be performed by the issue queue and/or other functional units. In an embodiment, two fusible load instructions are sent from an instruction fetch unit (IFU) over two lanes and written into a single issue queue entry as a fused instruction, where in an aspect the fused instruction waits to be issued to an execution unit.

The fused load instruction is issued to an execution unit at 825, and in an aspect the single fused load instruction in the issue queue issues to the execution unit using a single execution issue port. In an example, the fused load instruction in the issue queue, and in an aspect in a single entry in the issue queue that holds the information regarding the multiple original load instructions, issues to a load store unit (LSU) via a single LSU issue port. At 830 the execution unit, for example the LSU, executes (e.g., processes) the fused load instruction. In this regard, the LSU executes the fused load instructions and obtains the requested data corresponding to and requested by the two or more load instructions that formed the fused load instruction issued to the LSU. In one or more embodiments, the LSU obtains the desired or requested data pertaining to the two or more fusible load instructions from the data cache in the LSU, and in an embodiment from the L1 Data Cache. The LSU in an aspect can also obtain the requested data pertaining to the fusible load instructions from a store queue.

The results of processing the fused load instruction, e.g., the data requested by the two or more fusible load instructions, at 835 is written back to two or more entries in a register file. For example, where a fused load instruction pertaining to two fusible load instructions is executed by the LSU, the results, e.g., the requested data, is written back to two entries in the register file. In one or more embodiments, the results of the fused load instruction are written back to the register file at the same time, e.g., simultaneously. In an example, a fused instruction created from two fusible instructions is executed in an LSU, and the requested data, e.g., the results are written simultaneously to two different entries in the register file, e.g., a STF register file. In one or more embodiments, a first portion (e.g., a first half) of the fused load instruction pertaining to a first load instruction is written to one of the entries in a register file using a LSU write port and a second portion (e.g., a second half) of the fused load instruction pertaining to a second load instruction is written to a different entry in the register file using the write port from a different execution unit. The LSU typically will finish the fused load instruction and the iTags associated with the fused load instruction are sent to the completion unit, e.g., the instruction completion unit/table. The completion unit finishes all portions (e.g., both halves) of the fused instruction together.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for processing information, the computer system comprising:
    at least one processor having circuitry and logic to process instructions, the processor comprising:
    an instruction fetch unit having circuitry and logic to process instructions, the instruction fetch unit configured to fetch instructions;
    an instruction issue unit having circuitry and logic to process instructions, the instruction issue unit having an issue queue having a plurality of entries to hold the instructions and a plurality of issue ports to issue the instructions held in one or more of the plurality of issue queue entries;
    one or more execution units having circuitry and logic to process instructions, the one or more execution units including a load store unit to process one or more load and store instructions; and
    a register file to hold data for processing by the processor, the register file having a plurality of entries to hold the data,
    wherein the processor is configured to:
    determine whether two or more load instructions are fusible for execution in the load store unit as a fused load instruction;
    in response to determining that two or more load instructions are fusible for execution in the load store unit as a fused load instruction, transmit information to process the two or more fusible load instructions over multiple data lanes to the issue queue where the information to process each fusible load instruction is transmitted over a single data lane and into a single entry of the plurality of entries in the issue queue;
    issue the information to process the two or more fusible load instructions from the single entry in the issue queue as a fused load instruction to the load store unit using a single issue port of the plurality of issue ports in the issue queue, wherein the fused load instruction contains the information to process the two or more fusible load instructions;
    execute the fused load instruction in the load store unit; and
    write back data obtained by executing the fused load instruction simultaneously to multiple entries in the register file.

2. The system of claim 1, wherein the processor is further configured to determine whether two or more load instructions are fusible by detecting if the load instructions are consecutive load instructions, have address register fields that are the same, and immediate fields that are consecutive to each other in a data cache.

3. The system of claim 1, wherein the processor is further configured to determine whether two or more load instruction sequences are ascending fusible load instructions or descending fusible load instructions.

4. The system of claim 1, wherein the processor is further configured to:
    in response to determining that two or more load instructions are fusible, mark the two or more fusible load instructions as fusible; and thereafter,
    transmit the information to process the two or more fusible instructions into the single entry in the issue queue.

5. The system of claim 1, wherein in response to executing the fused load instruction in the load store unit, the load store unit is configured to read out multiple consecutive data chunks from a data cache in the load store unit.

6. The system of claim 1, wherein the processor is further configured to:
    transmit the two or more fusible load instructions to a dispatch unit;
    assign by the dispatch unit an instruction identifier to each fusible load instruction; and
    dispatch the information to process the two or more fusible load instructions to the single entry in the issue queue over multiple lanes where a single lane is used for each fusible load instruction dispatched to the single entry in the issue queue.

7. The system of claim 6, wherein the processor is further configured to:
    dispatch multiple instruction identifiers to an instruction completion unit having a completion table for tracking the completion of instructions, where each instruction identifier corresponds to one of the two or more fusible load instructions;

write each dispatched instruction identifier to one of a plurality of entries in the completion table; and mark the entries in the completion table corresponding to the two or more fusible load instructions to complete together.

8. The system of claim 1, wherein the processor is further configured to write a first portion of the fused load instruction to a first entry in the register file using a register file write port associated with the load store unit and write a second portion of the fused load instruction to a second entry in the register file using a register file write port associated with an execution unit other than the load store unit.

9. The system of claim 1, wherein the processor is further configured to:
detect an exception while processing the fused load instruction, and
in response to detecting an exception while processing the fused load instruction, the processor is configured to execute the two or more fusible load instructions forming the fused load instruction separately.

10. The system of claim 1, wherein the processor is configured to:
process two-consecutive load-immediate instructions as a fusible load instruction,
in response to detecting two consecutive load-immediate instructions as a fusible load instruction, transmit the two fusible load instructions into a single entry of the plurality of entries in the issue queue;
issue the two fusible load instructions from the single entry in the issue queue as a fused load instruction to the load store unit using a single issue port of the plurality of issue ports in the issue queue, wherein the fused load instruction contains the two fusible load instructions;
execute the fused load instruction in the load store unit; and
write back data obtained by executing the fused load instruction simultaneously to two entries in the register file.

11. A computer-executable method for processing information, the computer-executable method comprising:
fetching instructions in a processor, the processor having circuitry and logic to process the instructions;
determining whether two or more load instructions are fusible for executing in a load store unit of a the processor as a fused load instruction;
in response to determining that two or more load instructions are fusible for execution in the load store unit as a fused load instruction, transmitting information to process the two or more fusible load instructions over multiple data lanes to the issue queue where the information to process each fusible load instruction is transmitted over a single data lane to the issue queue and into a single entry of a plurality of entries in an issue queue;
issuing the information to process the two or more fusible load instructions from the single entry in the issue queue as a fused load instruction to the load store unit using a single issue port in the issue queue, wherein the fused load instruction contains the information to process the two or more fusible load instructions;
executing the fused load instruction in the load store unit; and
writing data obtained by executing the fused load instruction simultaneously to multiple entries in a register file.

12. The computer-executable method of claim 11, wherein determining whether two or more load instructions are fusible comprises detecting if the load instructions are consecutive load instructions, have real address fields that are the same, and immediate fields that are consecutive to each other in a data cache.

13. The computer-executable method of claim 11, further comprising:
in response to determining that two or more load instructions are fusible, marking the two or more fusible load instructions as fusible; and thereafter,
transmitting the information to process the two or more fusible instructions into the single entry in the issue queue.

14. The computer-executable method of claim 11, wherein in response to executing the fused load instruction in the load store unit, reading out multiple consecutive data chunks from a data cache in the load store unit by the load store unit.

15. The computer-executable method of claim 11, further comprising:
transmitting the two or more fusible load instructions to a dispatch unit;
assigning by the dispatch unit an instruction identifier to each fusible load instruction; and
dispatching the information to process the two or more fusible load instructions to the single entry in the issue queue over multiple lanes where a single lane is used for the information to process each fusible load instruction dispatched to the single entry in the issue queue.

16. The computer-executable method of claim 11, further comprising:
dispatching multiple instruction identifiers to an instruction completion unit having a completion table for tracking the completion of instructions, where each instruction identifier corresponds to one of the two or more fusible load instructions; and
writing each dispatched instruction identifier to one of a plurality of entries in the completion table; and
mark the entries in the completion table corresponding to the two or more fusible load instructions to complete together.

17. The computer-executable method of claim 11, further comprising:
writing a first portion of the fused load instruction to a first entry in the register file using a register file write port associated with the load store unit; and
writing a second portion of the fused load instruction to a second entry in the register file using a register file write port associated with an execution unit other than the load store unit.

18. A processor for processing information, the processor comprising:
an instruction fetch unit having circuitry and logic to process instructions, the instruction fetch unit configured to fetch instructions;
a dispatch unit having circuitry and logic to receive instructions from the instruction fetch unit and to dispatch the instructions;
an issue queue having circuitry and logic to process instructions, the issue queue having a plurality of entries to hold the instructions dispatched by the dispatch unit and a plurality of issue ports to issue the instructions held in one or more of the plurality of issue queue entries;

an instruction completion table (ICT) having circuitry and logic to track the instructions dispatched by the dispatch unit, the ICT having a plurality of entries to store data;

one or more execution units having circuitry and logic to process instructions, the one or more execution units including a load store unit to process one or more load and store instructions;

a main register file having circuitry and a plurality of entries for storing data, one or more write ports to write data to the main register file entries, and one or more read ports to read data from the main register file entries; and a mapper having circuitry and logic to map one or more main register file entries to one or more logical addresses used by the processor, wherein the processor is configured to determine whether two load instructions are fusible for execution in the load store unit as a fused load instruction;

in response to determining that two load instructions are fusible for execution in the load store unit as a fused load instruction, transmit information to process the two fusible load instructions over multiple data lanes to the issue queue where the information to process each fusible load instruction is transmitted over a single data lane and into a single entry of the plurality of entries in the issue queue;

issue the information to process the two fusible load instructions from the single entry in the issue queue as a fused load instruction to the load store unit using a single issue port of the plurality of issue ports in the issue queue, wherein the fused load instruction contains the information to process the two fusible load instructions;

execute the fused load instruction in the load store unit; and write back data obtained by executing the fused load instruction simultaneously to two entries in the register file.

* * * * *